(12) United States Patent
Salyer et al.

(10) Patent No.: US 6,765,031 B2
(45) Date of Patent: Jul. 20, 2004

(54) MICROPORE OPEN CELL FOAM COMPOSITE AND METHOD FOR MANUFACTURING SAME

(75) Inventors: Ival O. Salyer, Dayton, OH (US); Nicholas Wynne, Hilliard, OH (US); Michael Allen Swank, Montgomery, OH (US)

(73) Assignee: Vacupanel, Inc., Xenia, OH (US)

( * ) Notice: Subject to any disclaimer, the term of this patent is extended or adjusted under 35 U.S.C. 154(b) by 109 days.

(21) Appl. No.: 09/783,876

(22) Filed: Feb. 20, 2001

(65) Prior Publication Data

US 2002/0147242 A1 Oct. 10, 2002

(51) Int. Cl.$^7$ .................................................. C08J 9/08
(52) U.S. Cl. ........................ 521/99; 521/142; 521/146; 521/155; 521/170
(58) Field of Search ........................ 521/99, 142, 146, 521/155, 170

(56) References Cited

U.S. PATENT DOCUMENTS

| | | | |
|---|---|---|---|
| 4,162,341 A | 7/1979 | Norton | 428/117 |
| 4,726,974 A | 2/1988 | Nowobilski et al. | 428/69 |
| 5,082,335 A | 1/1992 | Cur et al. | 312/401 |
| 5,106,520 A | 4/1992 | Salyer | 252/70 |
| 5,185,111 A * | 2/1993 | Lazar | 264/49 |
| 5,252,408 A | 10/1993 | Bridges et al. | 428/621 |
| 5,512,345 A | 4/1996 | Tsutsumi et al. | 428/69 |
| 5,523,333 A * | 6/1996 | Fishback et al. | 521/131 |
| 5,844,014 A | 12/1998 | Malone | 521/146 |
| 5,943,876 A | 8/1999 | Meyer et al. | 62/371 |
| 5,950,450 A | 9/1999 | Meyer et al. | 62/457.9 |
| 6,079,404 A | 6/2000 | Salyer | 126/263.03 |

* cited by examiner

Primary Examiner—John M. Cooney, Jr.
(74) Attorney, Agent, or Firm—Thompson Hine LLP (57) ABSTRACT

A micropore open cell foam composite and a method for manufacturing a micropore open cell foam composite wherein the micropore open cell foam composites comprise a micropore open cell foam having an open cell content of greater than about 80% volume and an average pore size of about 200 microns or less and a phase change material in the open cell foam in the amount of 80% volume or greater.

13 Claims, 3 Drawing Sheets

MICROPORE OPEN CELL FOAM COMPOSITE AND METHOD FOR MANUFACTURING SAME

BACKGROUND OF THE INVENTION

Field of the Invention

This invention relates to an improved micropore open cell foam composite and a method for manufacturing the micropore open cell foam composites of the invention. The micropore open cell foam composites of the invention comprise a micropore open cell foam having an open cell content of greater than about 80% volume and an average pore size of about 200 microns or less and a phase change material in the open cell foam in the amount of 80% volume or greater.

Vaccines, antibiotics, and other temperature sensitive materials must typically be stored and transported under conditions wherein a narrow temperature range can be maintained for an extended period of time. Small size vacuum panel insulated refrigerators able to maintain a temperature of about 4° C. may be used for storage of vaccines and antibiotics. Vacuum panel insulated shipping containers have been used to transport the temperature sensitive materials from the refrigerator storage location to the end use location which may be at remote sites. Therefore, the shipping box must be capable of maintaining the temperature sensitive materials at the desired temperature for an extended period of time.

Vacuum panel insulation alone is not sufficient to keep antibiotics, vaccines and other temperature sensitive materials within the critical range of temperature required for the duration of the transit time. Accordingly, shipping containers capable of maintaining the temperature over a narrow range for an extended period of time may utilize vacuum panel insulation in the walls of the container and a phase change material in the interior of the container.

Phase change material compositions store and release large quantities of energy, in melting and freezing, and are selected such that the phase change materials are capable of maintaining the temperature within the desired range.

In one method of storing and transporting temperature sensitive materials, such as vaccines, the materials are removed from a storage refrigerator, placed in a vacuum panel insulated shipping container and surrounded on all sides with packages of phase change material. There are a number of ways in which the phase change material can be contained to minimize or eliminate the problems of expansion and contraction associated with melting or freezing and, thereby, prevent any leakage of the phase change material, in a liquid state, through small opening or cracks in the packaging material. Examples of these methods include containment in phase change material/silica gels and dry powders, melt mixes of phase change materials/high-density polyethylene/ethylene/vinyl acetate copolymers/silica, in cross-linked pellets of high density polyethylene and imbibed into various porous substrates (e.g., plasterboard).

The prior art systems available are based on refrigerator systems that freeze water to provide thermal storage temperatures of 0° C. or below. Exposure of temperature-sensitive medicinals such as vaccines, etc., to these low temperatures frequently results in irreversible damage due to freezing of water which is an essential component to many of these medicinal products. On the other hand, storage of the medicinals at temperatures greater than about 10° C. can also cause irreversible damage to the medicinals.

SUMMARY OF THE INVENTION

The present invention is a micropore open cell foam composite comprising an open cell foam having an open cell content greater than 80% volume and an average pore size of about 1 to 200 microns and a phase change material wherein the phase change material is contained in the interstices of the micropore open cell foam in the amount of about 80% volume or greater. The micropore open cell foam composites of the present invention are useful in combination with insulating panels used in insulating various structures where it is desirable to maintain the interior temperature of the structure at a constant temperature plateau which is different from the temperature outside the structure. In one manifestation of the invention, the micropore open cell foam composites are employed in portable containers for storing and transporting temperature-sensitive materials such as medicinals, e.g. vaccines, antibiotics, etc., to remote locations which lack adequate means for providing conventional temperature control.

In another aspect of the invention, methods for manufacturing the micropore open cell foam composites are described. In accordance with one method of manufacturing the open cell foamed composites, the phase change material is imbibed at reduced pressure (vacuum) into the open pores of the micropore foam. Alternatively, elevated pressure imbibing can be substituted for the vacuum imbibing. Micropore open cell foam composites of the present invention are characterized by the ability to incorporate very high volumetric concentrations of phase change materials in the micropore open cell foams, up to greater than 80% by volume. Micropore open cell foam composites in accordance with the present invention can be subjected to repeated freezing and thawing cycles without "ooze out" of the phase change material.

It is also possible to imbibe some materials by capillary attraction alone, without the application of either vacuum or pressure, into a hydrophilic micropore polyurethane open cell foam.

Micropore open cell foam composites in accordance with the present invention may contain relatively high volumetric concentrations of phase change material which can be particularly useful in applications where the available space is limited. The higher total loading of the phase change material possible with the micropore foam composites prepared in accordance with the present invention result in longer time-at-temperature (hold time) than with other methods of phase change material containment (e.g., PCM/silica gels or dry powders, or the melt mix of phase change material/high-density polyethylene/ethylene-vinyl acetate copolymer/silica).

In a particular embodiment of the invention, a micropore open cell foam composite is described which is particularly useful for use in a shipping container designed for transporting temperature-sensitive materials, such as antibiotics and vaccines. Many antibiotics and vaccines must be maintained within a critical range of temperature between 0 to 10° C. Shipping containers constructed of vacuum panel insulation alone are unable to maintain these temperature sensitive materials within the critical range of temperature required. A micropore open cell foam composite in accordance with the present invention, comprising specific percentages of a linear crystalline alkyl hydrocarbon blend of C-14, C-15, and C-16 carbon chains, when used in conjunction with a vacuum panel insulated container, is capable of maintaining the temperature sensitive materials at approximately 6° C. for an extended period of time. This particular phase change material blend, in sufficient quantity in the insulated shipping containing, has the necessary thermal storage capacity to keep the temperature sensitive material at a nearly constant temperature of about 6° C. for 40 hours, or longer, in transit.

DETAILED DESCRIPTION OF THE INVENTION

Figure 1:
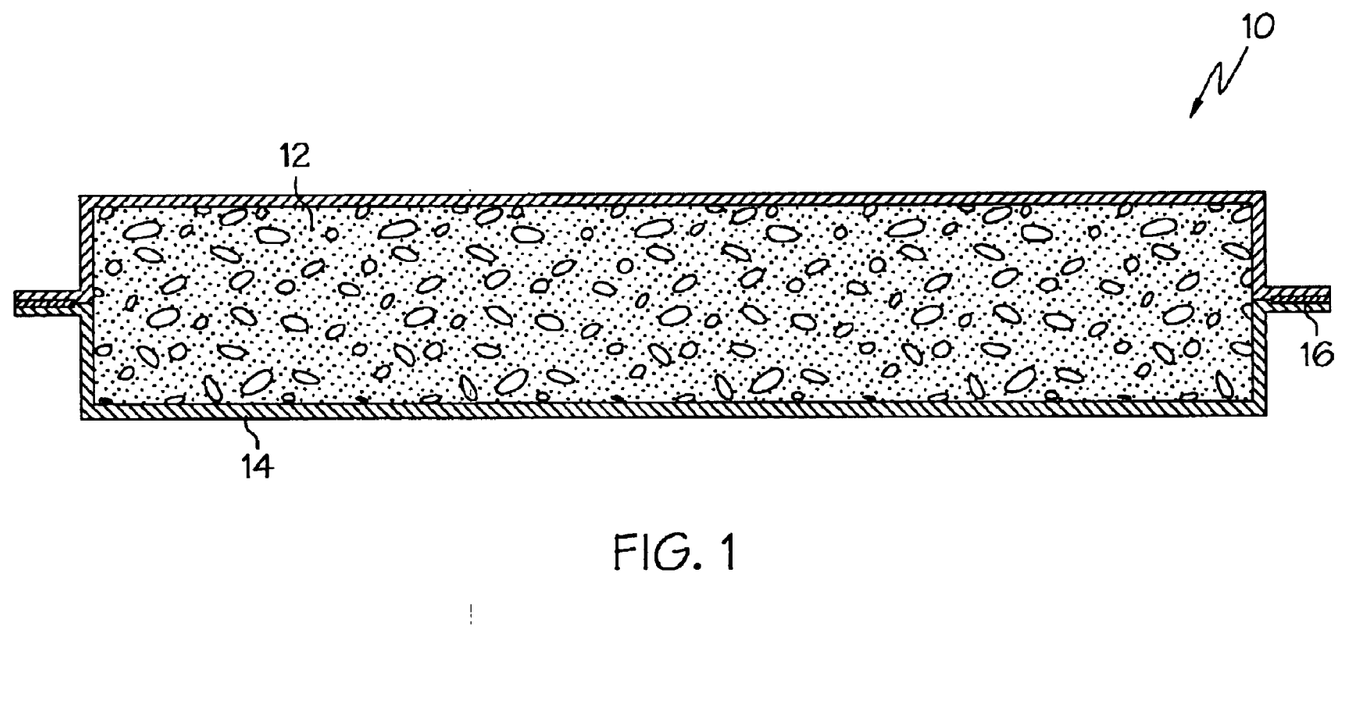
FIG. 1 is a cross-sectional view of the micropore open cell foam composite of the present invention in an envelope.

The present invention relates to a highly efficient micropore open cell foam composite. As illustrated in FIG. 1, the enclosed micropore open cell foam composite 10 includes a micropore open cell foam composite 12 contained in an envelope 14 sealed along heat seals 16. The micropore open cell foam composite 12 comprises a micropore open cell foam and a phase change material. The open cell foam has an open cell content of greater than about 80% volume and an average pore size of about 1 to 200 microns. The phase change material is contained in the interstices of the micropore open cell foam in the amount of about 80% volume or greater.

The micropore open cell foam composite 12 may be formed by evacuating an open cell foam and filling the evacuated foam with a phase change material. The open cell foam may be evacuated to an internal pressure of less than about 100 torr, or less than about 10 torr, and, depending on the foam composition and the phase change material, may be evacuated to an internal pressure of about 1 torr or less. The micropore foam composite may be placed in an envelope 14. The enclosed micropore open cell foam composite 10 may optionally be vacuum sealed. The vacuum sealed foam composite 10 can be provided with a re-entry port (not shown) through which the foam composite can be re-evacuated if necessary.

The micropore open cell foam composites 12 of the present invention can be used in any application where the temperature must be maintained in a specific narrow range for an extended period of time. For example, the micropore open cell foam composites of the present invention can be used in shipping containers for medicines, vaccines, antibiotics, and organ transplants. The foam composites of the invention are particularly effective for providing relatively constant temperature over a specific narrow range for shipping containers which allow the safe storage and transportation of medicinals worldwide, even in the most remote areas of the world.

The micropore open cell foam composites of the present invention can be manufactured in accordance with the following steps which comprise:

(a) providing an open cell foam having an open cell content of 80% or more and having an average cell size of about 1 to about 200 microns;

(b) enclosing the open cell foam in a heat-sealable, polymeric film pre-formed in the shape of an envelope;

(c) evacuating the open cell foam-containing envelope;

(d) charging the open cell foam with a phase change material;

(e) repackaging the PCM-loaded foams in a suitable impermeable envelope;

(f) optionally, evacuating the impermeable envelope containing the PCM-loaded open cell foam composite; and (g) sealing the envelope containing the open cell foam composite.

As an alternative to using an envelope as described above, the open pore foam composite can be placed between two sheets of a heat-sealable, polymeric-film used to enclose the micropore foam and the peripheral edges of the film are heat-sealed to form the enclosed open cell foam composite. It will also be recognized by those skilled in the art that the open cell foam can be placed on a single sheet of the heat-sealable, polymeric film and the film can be folded over the open cell foam such that only three of the peripheral edges of the film need to be heat sealed to form the enclosed, micropore open cell foam composite.

Alternatively, the entire process can be carried out in a pressure chamber. In this aspect of the invention, the micropore open cell foam blocks are placed in the chamber, which is then evacuated through one port with a valve. The valve is closed when the pressure is below 1 torr. The second valve is opened to a second port having a line to a reservoir of liquid PCM, which is then drawn into the chamber. The PCM is allowed to saturate the foam in the chamber and then a third port valve is opened to allow low-pressure compressed air to gently return any excess liquid PCM to the reservoir. Finally, the second and third valves are closed and the fourth valve is opened to expose the chamber to atmospheric pressure for opening the lid safely. Optionally, the micropore open cell foam composite with the imbibed PCM materials can be resealed in an impermeable envelope and then the foam composite in the sealed envelope can be re-evacuated.

In yet another aspect of the invention, the micropore open cell foam is charged with a PCM material by introducing the PCM under positive pressure. A slab of the micropore open cell foam having a plurality of sides is loaded with PCM by enclosing the open cell foam in a metal mold on all but one of the sides, leaving one remaining open side of the foam slab. Through a port in one of the closed sides (preferably opposite the one remaining open side), the liquid phase change material is injected under a positive pressure of about 15 psi or greater until the liquid PCM material emerges from the one remaining open side. The micropore cell foam composite is sealed and the enclosed foam composite may be evacuated as described above.

Yet another method for imbibing micropore open cell foams is particularly useful in imbibing open cell polyurethane foam with small polar molecules. Small polar molecules such as water can imbibe by capillarity into the open cells of a hydrophilic polymer, such as polyurethane foam. Accordingly, imbibing of such small polar molecules, typically water-based, into the micropore open cell polar polyurethane foam can be conducted at ambient pressure. The imbibed foam composite is then sealed. The imbibed foam composite in the sealed container may also be evacuated.

It is desirable to use micropore foams having as high an open cell content as possible. The higher the open cell content, the greater the level of evacuation or vacuum possible in the foam. The greater the level of evacuation, the greater the PCM loading. The present foam has an open cell content of 80 percent or more, preferably 90 percent or more, and most preferably 95 percent or more. The foam is preferably as close as possible to complete or 100 percent open cell.

Figure 2:
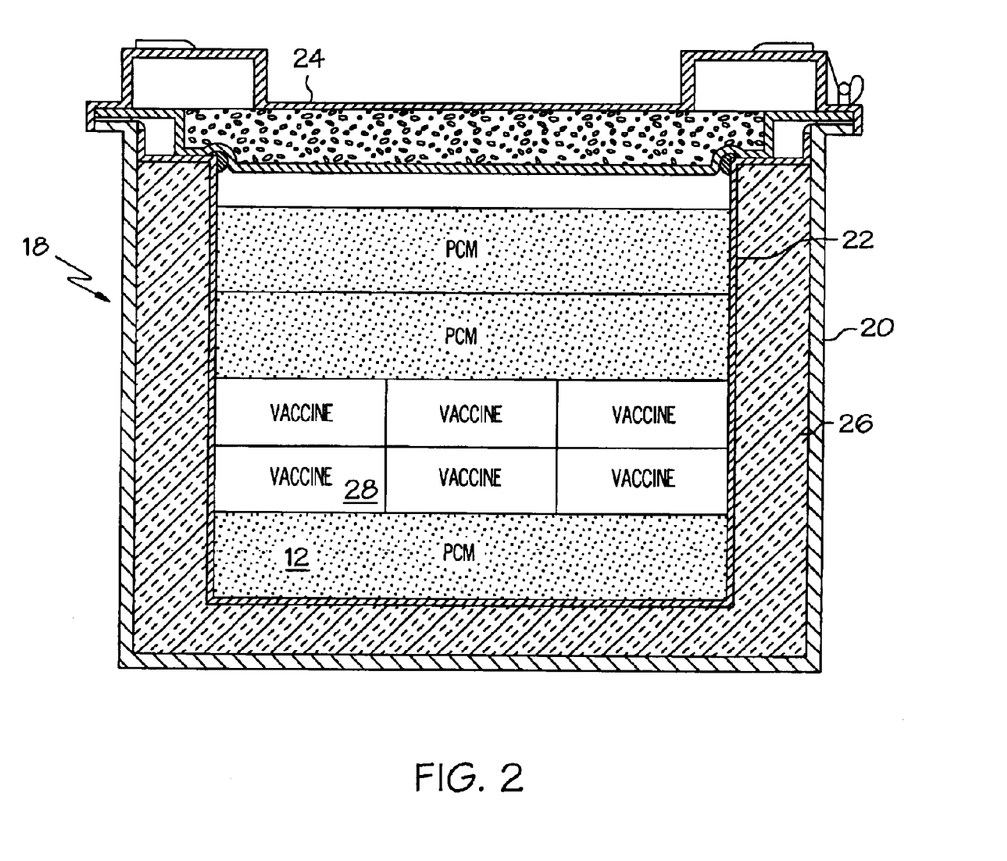
FIG. 2 is a cross-sectional view of a highly insulated, portable container used to transport temperature-sensitive materials to remote locations utilizing the micropore open cell foam composites of the present inventions.

As illustrated in FIG. 2, the highly insulated, light-weight container 18 useful for transporting the temperature-sensitive material to the various remote areas includes outer walls 20, inner walls 22 and a lid 24. Insulating material 26 is positioned between outer walls 20 and the inner walls 22. Insulating material 26 preferably is an insulating vacuum panel as described in commonly assigned U.S. Pat. Nos. 5,943,876 and 5,950,450. Although many materials can be used to construct the inner and outer walls of the shipping container 18, polymeric materials such as polyolefin, e.g., polypropylene and copolymers, polystyrene, and styrene/acrylonitrile copolymers, etc . . . are particularly preferred because of their durability, light weight and low thermal conductivity.

The micropore open cell foam composites 12 of the invention are placed in the shipping container 18 typically in intimate contact with the temperature-sensitive material 28 to maintain a constant temperature plateau in the closed interior of the container 18 for a prolonged period of time which can be up to about 6 days or more. The temperature sensitive material 28 may be positioned between a plurality of foam composites 12, as shown. Of course, the temperature sensitive material 28 and the micropore open cell foam composite 12 can be positioned in any arrangement within the shipping container 18 which maintains the desired temperature for the required period of time. One advantage of the micropore foam composites 12 of the present invention is that they can be positioned in such a way so as to maximize the usage of space within the shipping container 18. By using a predetermined shape of a micropore open cell foam composite 12, it is possible to make more efficient use of the space available in the shipping container. Furthermore, the micropore open cell foam composites 12 of the present invention provide an increased load of PCM as compared to prior art methods, thereby improving the ability to maintain a relatively constant temperature for an extended period of time.

Phase change materials (PCM) are advantageously used in the embodiments of the present invention. Phase change materials undergo a change in their physical form, or state, from a solid-to-liquid and liquid-to-gas, as the temperature is progressively increased from absolute zero. During the phase change from solid-to-liquid and liquid-to-gas, heat is absorbed from the surrounding environment. Conversely, in cooling from gas-to-liquid and liquid-to-solid, heat is evolved to the environment. This heat that is absorbed or evolved in these phase transitions is called latent heat and it can occur over a very narrow range of temperature. The heat that is absorbed or evolved without a change of state is called sensible heat, and occurs over a wide range of temperature to supply significant thermal storage capacity. Over a limited range of temperature (e.g., 10° C.), the latent heat of the solid-to-liquid transition is 5–8 times greater than the sensible heat storage. The difference in thermal storage between latent and sensible heat is even larger in the liquid-to-gas transition.

However, some materials, because of crystallinity, strong intermolecular attraction (e.g., hydrogen bonding), and/or regularity of molecular structure, absorb and evolve much larger amounts of latent heat in going through these changes in physical state. The materials with very high latent thermal energy storage are commonly identified as "phase change materials (PCM)."

The liquid-to-gas transition is always much more energetic than the solid-to-liquid transition. However, the liquid-to-gas transition involves very large volume changes, and high pressures, that make these materials undesirable for many applications while uniquely qualifying them for others (e.g., steam turbines). The molecules that comprise phase change material may be either inorganic or organic. Of the inorganic phase change materials, water in its solid-to-liquid transition at 0° C, and liquid-to-gas at 100° C. is one of the most energetic and lowest cost for use at either of its phase change temperatures (0° and 100° C.). The temperature to be maintained depends, of course, on the nature of the temperature-sensitive material. The melting and freezing temperature of the phase change material can be adjusted to maintain temperature sensitive materials within a specific temperature range. Furthermore, phase change materials can be selected to cover a broad temperature range spectrum.

The phase change material may be selected from a linear crystalline alkyl hydrocarbon of appropriate melting and freezing temperature. However, other phase change materials may also be used in certain instances including organic fatty acids, fatty acid esters, and primary alcohols such as $C_1$–$C_{22}$ primary alcohols, water/CaO, glycol, water/NaCl, water/urea, water/glycerine, or mixtures thereof. In applications where temperature control is desired at temperatures of 0° C. or lower, water and water-based phase change material, such as the lower freezing combinations of water/urea, water/salt and water glycerine, can be utilized. Water/salt hydrates are all so useful as phase change materials. Examples of salt hydrates which can be used include, but are not limited to, sodium sulfate decahydrate, calcium chloride hexahydrate, trisodium phosphate dodecahydrate, disodium monohydrogen phosphate dodecahydrate, and sodium acetate trihydrate. Liquefied gases can also be used as phase change materials for very low temperature applications. Examples of useful liquefied gases include liquid nitrogen, oxygen, helium, carbon dioxide, air and other mixtures thereof.

Obviously, there are many applications, in addition to those listed, that can make effective use of the new combination of phase change material contained in micropore open cell foam and enclosed in a strong impermeable composite film envelope. In combination with shipping containers constructed with vacuum panel insulation, the phase change material can be used to provide a plateau of nearly constant temperature for protecting temperature-sensitive materials for extended periods of time.

For temperatures from about −40° C. to 132° C., organic molecules comprised of linear crystalline alkyl hydrocarbons having an average carbon chain length of at least 8 carbon atoms are useful and cost effective phase change materials. Linear crystalline alkyl hydrocarbons having an average carbon chain length of about 12 to 18 carbon atoms and a phase change temperature between about 0° C. and 30° C. are useful in particular applications in accordance with the invention. These linear crystalline alkyl hydrocarbon materials are low cost by-products of petroleum refining, and normally consist of a mixture of three or more carbon chain lengths that store and release about 35 calories/gram or more in melting and freezing. Ultra pure phase change materials are obtained by special synthesis, or extensive fractionation, have higher thermal energy storage of up to about 60 calories/gram. For example, 98% pure $C_{14}$ tetradecane has a thermal storage capacity of at least about 55 calories/gram, but these ultra pure phase change materials also cost several times as much as the less pure products from petroleum refining. Accordingly, because of the high cost, the ultra pure alkyl hydrocarbon phase change materials are only used in special applications in which the very high cost can be justified.

In order to safely transport and store temperature-sensitive materials, they must be maintained within a narrow temperature range. Medicinals such as vaccines, antibodies, etc., for example, must be maintained at temperatures above 0° C. and below 10° C., and preferably between +2 and +8° C. Phase change materials useful in this type of application include linear, crystalline alkyl hydrocarbons, or mixtures thereof, having an average carbon chain length of about 13 to 16 carbon atoms, as sold by Exxon under the trade name of Nor Par NP-15, or by Humphrey Chemical Company as technical or 98% pure tetradecane (C-14), and hexadecane (C-16).

In accordance with one aspect of the invention, the phase change material is a mixture comprising about 45 to 50% by weight of a high purity, crystalline, linear $C_{16}$ alkyl hydrocarbon, about 30 to 35% by weight of a crystalline, linear $C_{14}$ alkyl hydrocarbon, and about 15 to 25% by weight of a normal paraffin mixture having an average chain length of about 15 carbon atoms.

The combination of high thermal energy storage, affordable cost, stability to thermocycling, non-toxicity, commercial availability, etc., of the linear crystalline alkyl hydrocarbons from petroleum refining are not even approached on an overall basis by any other phase change material found in surveys of the published and patent literature. Desirable cost/performance properties of the linear crystalline alkyl hydrocarbon include:

High thermal energy storage (35–60 calories/gram);

Low-cost and available in large quantities;

Self-nucleating (no supercooling);

Stable to repeated thermocycling;

Non-toxic, not chemically reactive;

Non-hydrolyzable in an alkaline environment (e.g., concrete); and

Selectable melting temperatures from well below 0° C. to above 132° C.

Figure 3:
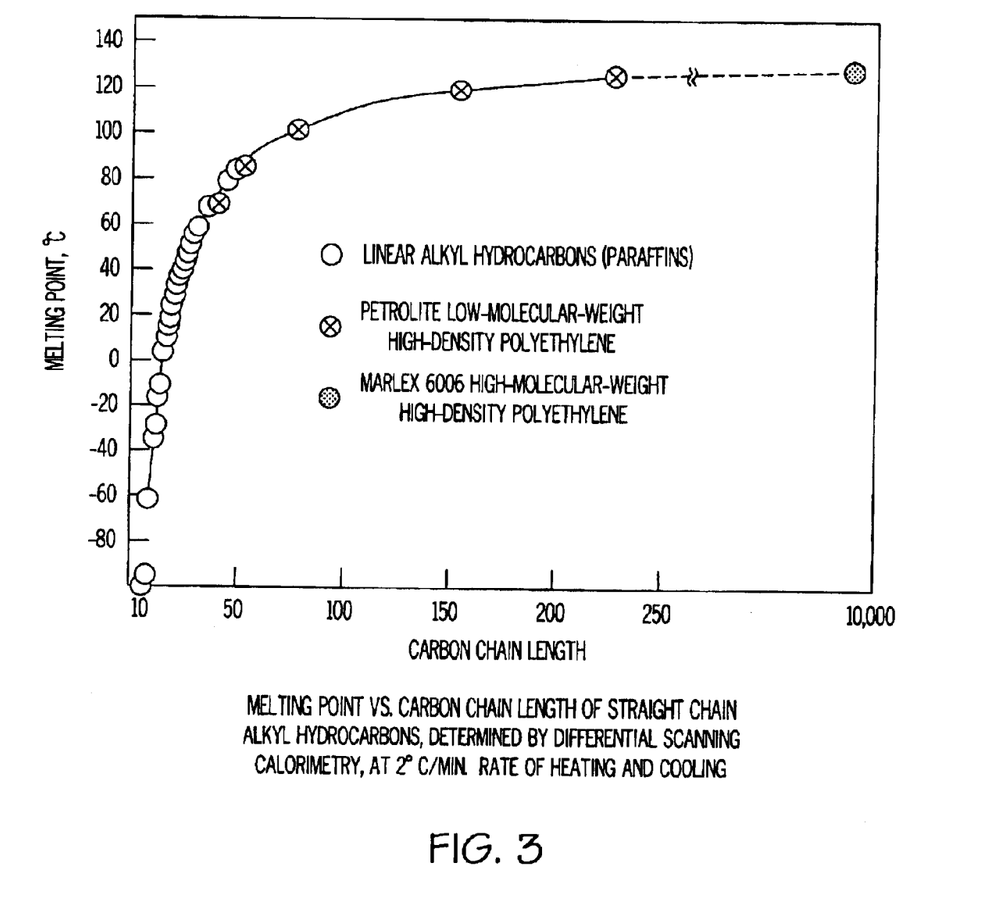
FIG. 3 is a graph showing melting temperature versus carbon chain length for commercially available alkyl hydrocarbon phase change materials.

A graph of melting temperature versus carbon chain length for commercially available alkyl hydrocarbon phase change materials is shown in FIG. 3 and illustrates the broad range of melting temperature available in these materials. This enables phase change materials to be selected that have the proper melting and freezing temperatures as needed for different applications.

In another aspect of the invention, liquefied gases are used as phase change materials. In some cases it is desired to use an insulated shipping or storage container for payloads at cryogenic temperatures and to employ liquid nitrogen or another liquefied gas as the PCM to maintain cryogenic temperature at a plateau which is the temperature of vaporization of that gas at end use temperature and pressure.

To use liquid nitrogen or another liquefied gas as a PCM for shipping in conventional systems requires complex containers designed so only the gas vapor generated during phase change can escape, but none of the liquid will. By imbibing the liquefied gas into a microporous foam, the cells hold the liquid closely enough to prevent spillage of the liquid while still allowing the gas to evolve from the surface and to go through a vent from any orientation. The absorbed and/or adsorbed liquefied gas cannot readily exit the microporous core without first changing phase to gas to push the liquid out. Since cooling from vaporization occurs at the surface of the block, the core is kept too cool for this to occur, and the liquid changes to gas, working from the surface inward.

Micropore open cell foam composites imbibed with liquefied gas can be handled after the fashion of dry ice slabs, thus avoiding all liquid handling and the complexities of a container designed to use neat liquefied gas as the PCM. If a container is insulated well enough that the surface does not get too cold for human handling, then it may be possible to ship by conventional carrier using these slabs, depending on the composition of the liquefied gas.

Having the ability to imbibe liquid carbon dioxide under pressure at room temperature, then allow the imbibed block to freeze itself as the pressure drops toward ambient pressure provides a means whereby dry ice for shipping may be obtained from room temperature bottled carbon dioxide without having cold storage or conventional dry ice making equipment at hand. Additionally, the size of the substrate the microporous core material comprises will determine the size of the finished dry ice block. Conventional dry ice slabs are difficult to size exactly and change size as they sublimate. Whether self-frozen, or imbibed and frozen before relieving pressure, the size control provided by the imbibed composite form allows for better control of package sizing and proximity of the payload to the PCM.

Liquefied gases useful as phase change materials in accordance with the invention include, but are not limited to, liquid nitrogen, oxygen, carbon dioxide, helium, air and other combinations thereof. Liquefied gases are useful in maintaining temperatures at very low temperatures. Using any of the liquefied gases as the phase change materials allows the payload to be maintained at a temperature plateau equal to the temperature of vaporization or, in the case of dry ice, at the temperature of sublimation. Nitrogen is the most common liquefied gas used for this purpose. At 1 atmosphere pressure and an ambient temperature greater than $-196°$ C., nitrogen will maintain a temperature plateau of about $-196°$ C. as it vaporizes. It does this by absorbing incoming heat in the amount of its heat of vaporization of 47.5 cal/gm as it undergoes the change of phase from liquid to gas under those ambient conditions. Dry ice sublimates directly from solid to gas at 1 atmosphere if the ambient temperature is greater than $-78.5°$ C., absorbing about 141 cal/gm in this change of phase to maintain a temperature plateau at about that temperature. The temperature plateaus may vary a bit due to impurities in the liquefied gas or the solid carbon dioxide. There is also likely to be an elevation of a few degrees, perhaps 2 to 5° C., in the temperature plateau experienced by the payload due to imperfect thermal contact between the payload and the PCM. The exact difference will vary with insulation value and ambient temperature.

The phase change materials useful in the present invention may also contain from about 0.1 to 1.0 weight percent of an antioxidant. Santowhite Powder®, an antioxidant from Monsanto, has been found to be particularly effective in particular applications of the present invention.

The basic instrument used to guide research on phase change materials is the differential scanning calorimeter (DSC). This instrument imposes a controlled rate of heating and cooling on a small sample in a well-insulated test chamber, and compares the heat absorbed (endotherm) and emitted (exotherm) against a control. Using the DSC, one can accurately determine, independently of the surrounding environment, the important basic parameters of phase change material, including: the melting and freezing temperature; the range of temperature over which melting and freezing occurs; the rate dependence of melting and freezing; the degree of supercooling, if present; and a quantitative measure of the heat of fusion and crystallization.

The DSC tests can be run at rates of heating and cooling ranging from 100° C./minute to 0.1° C./minute, but a standard rate for phase change material screening tests is 2° C./minute. The DSC data is usually plotted as time versus heat flow of the sample, although plots of heat flow versus temperature can also be printed out by the DSC computer. The area of the endotherm and exotherm is integrated by the computer as Joules/gram. This value is converted to the more commonly used calories/gram by dividing by 4.185.

There are several problems associated with the direct use of 100% solid-to-liquid phase change material, including linear crystalline, alkyl hydrocarbon phase change materials. These problems are of such character and magnitude as to jeopardize or prevent successful use of the phase change material technology for most applications. These inherent problems include: large volume changes in melting and freezing, low viscosity in the liquid state and attendant problems of leakage, slow heat transfer rate, and adverse effects on the physical properties of the matrix. It has been found that the above problems can be eliminated or minimized if the phase change material is "contained," particularly in accordance with one of the following procedures:

(1) Containment of the 100% phase change material in "microcapsules" or other liquid impervious enclosures such as pouches of plastic, metal or foil, or a container of glass or ceramic.

(2) Microencapsulation of phase change material in 25–250µ spheres, preferably having >90% phase change material core and <10% polymer shell.

(3) Imbibing phase change material into porous substrates at up to 60% by weight concentration.

(4) Permeation of phase change material into pellets of cross-linked high density polyethylene at 70% by weight.

(5) Dissolving phase change material at 60% by weight in thermoplastic compositions of phase change material/high density polyethylene/ethylene-vinyl acetate copolymer/silica, preferably at a ratio of about 60:16:8:16.

(6) Incorporating phase change material in dry powders of phase change material/silica, preferably at a ratio of about 75:25.

(7) Incorporating phase change material in gels of phase change material/silica, preferably at a ratio of about 82:18.

(8) Imbibing phase change materials into the open pore cells of micropore structures (e.g., foams).

In accordance with (8), phase change material compositions in one aspect of the present invention may comprise about 45 to 50 weight percent hexadecane, about 30 to 35 weight percent tetradecane, about 15 to 25 weight percent of an n-paraffin having an average chain length of about 15 carbon atoms, and about 0.1 to 1.0 weight percent antioxidant. A phase change material/composition containing about 48 weight percent A16, a hexadecane from Humphrey Chemicals Company, 32 weight percent A14, a tetradecane from Humphrey Chemical Company, about 20 weight percent NP15, an n-paraffin having an average chain length of about 15 carbons from Exxon, and 0.8 weight percent Santowhite Powder®, an antioxidant from Monsanto, has been found to be particularly effective in particular applications of the present invention.

Micropore open cell foam composites comprising a micropore open cell foam and an imbibed phase change material are advantageous in that the composite compositions do not exude ("ooze") phase change material during repeated thermocycling, above and below the crystalline melting temperatures. In order to ensure against this possibility in long time use through thousands of melt/freeze cycles and to permit successful use of micropore open cell foams with slightly larger than 200 microns, small amounts of polymeric additives may be incorporated into the phase change material formulation to function as thickening agents and thereby effectively prevent oozing in repeated thermocycling. The polymeric thickening agents are typically present in a concentration of about 1 to 10% by weight based on the weight of the phase change material.

Polymeric thickening agents useful with non-polar phase change materials, such as linear crystalline alkyl hydrocarbons, fatty acids and esters, primary alcohols, ethylene glycol copolymers, polyethylene oxide and polyethylene, include, but are not limited to, polyisobutylene polymers and copolymers, isobutylene copolymers (e.g., butyl rubber), ethylene/propylene/diene copolymers (EPDM), polyisoprene (natural and synthetic rubber) polybutadiene, styrene/butadiene copolymers (both random and block copolymers), polyethylene (low and high density), and polymethyl methacrylate polymers with long alkyl side chains (such as used as viscosity index improves in automotive motor oils).

Polymeric thickening agents useful with polar phase change materials, such as water, water/urea, water/glycerine, water/salt, water/salt hydrates, and quaternary ammonium clathrates and semi-clathrates, include, but are not limited to, polyvinyl alcohol, polyethylene glycol, polyethylene oxide, polyacrylic acid, polymethacrylate acid, vinyl acetate/maleic acid copolymers, and other water soluble polymers.

In one embodiment of the present invention, the flexible envelope is prepared from a multi-layer film containing at least one layer which exhibits good air ($N_2$,$O_2$) barrier properties and at least one layer which exhibits good water-barrier properties. One particularly effective polymeric film for use in this embodiment is a co-extruded, multi-layer material which comprises at least one layer of polyethylene terephthalate (PET), at least one layer of polyvinylidene, chloride (PVDC), and at least one layer of polyvinyl alcohol (PVOH). Preferably, at least one of the polyethylene terephthalate layers has an aluminum film coated on at least one surface thereof. A multi-layer barrier film found to be effective for use as the envelope of the present invention typically exhibits a gas (particularly $O_2$ and $N_2$)permeation rate of about 0.00001 CC/24 hours/100 sq. in./mm thickness at atomospheric pressure, 73° C. and 0% RH. Such a film is available from Tennessee Press, Knoxville, Tenn. under the trade name DuPont 153-1.

Another multi-layer film particularly effective in this embodiment is prepared from a flexible multi-layer film containing at least one ethylene-vinyl acetate or polyvinyl acetate layer, at least one polyethylene terephthalate layer, at least one polyvinylidene chloride (PVDC) layer, and at least one polyvinyl alcohol layer, and at least one polyamide layer. Preferably, at least one of the polyethylene terephthalate layers has an aluminum film evaporated on at least one surface thereof and/or an aluminum foil on at least one surface thereof. Such a film is available from Toyo Aluminum KK.

In another embodiment of the present invention, the flexible envelope is a biaxially oriented monolithic liquid crystal polymer (LCP). A particularly preferred biaxially liquid crystal polymer is a wholly aromatic copolyester such as poly(benzoate-naphthoate). Liquid crystal, wholly aromatic copolymer resins are available from Ticona, a member of the Hoechst Group under the trade name Vectra A and Vectra C. The liquid crystal polymers most useful as the envelope material of the present invention should be biaxially oriented in order to provide the necessary flexibility to bend and shape without losing its integrity, i.e., without cracking or breaking.

In order that the invention may be more readily understood, reference is made to the following examples, which are intended to be illustrative of the invention, but are not intended to be limiting in scope.

EXAMPLE 1

6"×6"×1" specimens of micropore open cell foam (ICI Huntsman polyurethane open cell foam blocks) are placed in separate Toyo impermeable, heat and solvent resistant film envelopes (Toyal™) The envelopes are heat sealed on three sides and provided with a closeable vacuum port on the fourth side. Note, the film bags should be essentially filled with the foam blocks to minimize the number of wrinkles that will fill with PCM.

A vacuum pump is attached to the samples and the air is evacuated to a pressure of 1 torr or less. The vacuum port is heat sealed and the vacuum pump is disconnected. The evacuated bag is placed in an oven pre-heated to 90° C. The ICI foam should heat within ten minutes.

A volume of C-80 PCM sufficient to allow complete immersion of the evacuated samples is introduced to a metal vessel. One part by weight of Santowhite Powder Antioxidant, is added to the C-80 PCM material and heated to a temperature of 90° C. with stirring until all of the C-80 material is completely melted and liquefied. The evacuated foam samples are completely immersed in the C-80 heated solution. A long slit is cut in the heat sealable plastic and the hot PCM liquid is allowed to imbibe into the foam until the foam is saturated. The imbibed foam sample is removed from the imbibing vessel and the film cover is stripped off.

The imbibed foam specimens are thermocycled ten times between the temperatures of 50° C. and 100° C. for such time as necessary for the PCM to completely freeze or thaw at each temperature extreme respectively.

The micropore open cell foam composites are repackaged in a suitable impermeable envelope equipped with a closeable vacuum port. The foam composites are evacuated to a pressure of about 100 torr and then the vacuum port is sealed off and the vacuum pump is disconnected. Note: the partial evacuation is recommended as a means of keeping the packaging film in contact with the PCM during normal changes in atmospheric pressure or to prevent "ballooning" in air shipping where it would be exposed to less than atmospheric pressure.

It should be noted that several foam samples, of the same or different sizes, can be inserted in a single, large envelope and evacuated and imbibed simultaneously. Imbibing of the large bag can be accomplished by immersing only the bottom end in the PCM and then slitting the bag to admit PCM below the immersion line.

EXAMPLE 2

The micropore open cell foam composites of the present invention can also be prepared by charging the micropore open cell foam with PCM under pressure. In accordance with this embodiment, the film blocks are placed in a pressure chamber, which is then evacuated through one port with a valve. The valve is closed when the pressure is below 1 torr. A second valve is then opened to a second port having a line to a reservoir of liquid PCM, which is then drawn into the chamber. The PCM is allowed to saturate the foam in the chamber and then a third port valve is opened to allow low pressure compressed air to gently return any excess liquid PCM to the reservoir. The second and third valves are then closed and a fourth valved is then opened to expose the chamber to atmospheric pressure for opening the lid safely. The imbibed samples are then repackaged into a suitable impermeable envelope, equipped with a closeable vacuum port. They are evacuated to a pressure of about 100 torr, and the vacuum port is sealed off and the vacuum pump is disconnected.

EXAMPLE 3

Example 1 is repeated with the exception that distilled water is substituted for the C-80 PCM and thermocycling is conducted between temperatures of −15° C. and +25° C.

EXAMPLES 4–7

Micropore open cell foam composites were prepared in accordance with the present invention using a phase change material having a phase change temperature of about 6° C. The micropore open cell foam composites were tested in accordance with a general operational procedure for using the composites and shipping container for vaccine transport. In accordance with the operational procedure, the transport facility has a refrigerator where the vaccine is stored at a temperature of 3.8° C. The open cell foam composites of the invention are placed in the same refrigerator for at least 24 hours. To transport the vaccine, one bag of the micropore open cell foam composite is placed in the bottom of the shipping container and then the vaccine is placed in the shipping container on top of the composite. The remaining space on top of the vaccine is filled with the micropore open cell foam composite. If one layer of vaccine is placed on top of the first composite bag then there is space for four more bags on top of the vaccine in a conventional shipping container. When the last bag of composite is placed in a shipping container the lid is closed and latched. The unit is now ready for transport.

To determine how long the shipping container and micropore open cell foam composite of the present invention will keep the vaccine at a safe temperature (e.g., less than 18° C. Although a safe temperature for this particular vaccine is less than 18° C., the generally recognized limit for most vaccines is less than 10° C.), the following testing procedure was used. Empty glass vials and cardboard boxes were used to simulate the vaccine. A thermocouple was pressed against the glass vial and held in place with adhesive tape. Two vials were instrumented in each shipping container. Two shipping containers were tested at each environmental temperature (48° C., 37° C., 30° C. and 24° C.).

The shipping containers were placed in the environmental chamber which was regulated at the desired temperature. The shipping containers were kept in the chamber for 12 hours or more to allow them to come to equilibrium with the temperature of the environment. The micropore open cell foam composites were placed in a refrigerator for 24 hours with a thermostat set a 3.8° C. The instrumented vials plus several additional vials were also pre-cooled by placing them in a shipping container with some PCM at 3.8° C. This simulates having the vaccine in a refrigerator prior to transfer.

The test was started by removing five bags of the micropore open cell foam composite and transferring them to the environmental test chamber. One bag of the PCM/foam composite was placed in the shipping container and then two of the pre-cooled and instrumented vials were placed on top of the bag. The layer was then filled with the other pre-cooled vials. The space above the simulated vaccine was then filled with four more bags of PCM/foam composite. The lid was latched closed and the timed temperature recorder was started.

The test results are shown below in Table 1:

TABLE 1

| Example | Environmental Temperature | Hold Time for Vaccine at less than 18° C. |
|---------|---------------------------|-------------------------------------------|
| 4 | 48° C. | 26.5 hours |
| 5 | 37° C. | 31 hours |
| 6 | 30° C. | 44 hours |
| 7 | 24° C. | 64 hours |

As can be seen from Table 1, the micropore open cell foam composite of the present invention when used with an insulated shipping container is capable of holding the temperature in the shipping container at less than 18° C. for more than 24 hours at an environmental temperature of 48° C. and over 60 hours at an environmental temperature of 24° C.

EXAMPLE 8

A human tissue for transplanting is stored at ambient pressure liquid nitrogen temperature. A highly insulated container, with an integral gas vent to relieve evolving gas pressure, such as may be made with vacuum insulation panels, is prepared. Several blocks of open cell microporous foam, such as Dow Instill™, are cut to fit the bottom, sides and top of the space within the insulated container. The blocks are then dropped into a storage tank of liquid nitrogen to soak it in. Alternatively, if maximum uptake is required, the blocks are placed in a plastic bag which is evacuated, dropped into the liquid nitrogen and pushed down with safety tongs onto a sharp puncturing tool at the bottom of the liquid nitrogen Dewar vessel, so the evacuated bag punctures below the liquid level and the blocks are held there until they draw the liquid in. The imbibed blocks are then removed with safety tongs and placed in the bottom and against the sides of the container. The payload is then placed within the container, the top slab of liquid nitrogen/Instill™ composite is placed over top of the payload, the lid insulation is put in place and the box is closed, sealed, appropriately labeled and shipped.

EXAMPLE 9

A pharmaceutical is to be shipped at dry ice temperature. A highly insulated container with an integral gas vent to relieve evolving gas pressure, such as may be made with vacuum insulation panels, is prepared. Several blocks of open cell microporous foam, such as Dow Instill™, are cut to fit the bottom, sides and top of the space within the insulated container. The blocks are then dropped into a pressure vessel capable of handling the pressure of liquid carbon dioxide at ambient temperature, and a restraint traps them in the bottom of the vessel. An inverted tank of liquid carbon dioxide is used to pressure the vessel until liquid carbon dioxide fills it and saturates the foam. A bleed valve at the top of the pressure vessel may be employed to judiciously bring the temperature down enough in the pressure vessel to insure the liquid form carbon dioxide is kept in it.

A gas cylinder pressurized with nitrogen or other gas which is kept compressed at pressures above the pressure of liquid carbon dioxide is used to force excess carbon dioxide out of the bottom of the pressure vessel and back into the carbon dioxide storage container. Both gas cylinders are closed off, and pressure is gradually released from the pressurized vessel allowing the liquid carbon dioxide composite blocks to freeze themselves. With the internal pressure back to ambient pressure, the pressure vessel is opened and the frozen composite blocks are removed and placed in the bottom and against the sides of the container. The payload is then placed within the container, the top slab of carbon dioxide/Instill™ composite is placed over top of the payload, the lid insulation is put in place and the box is closed, sealed, appropriately labeled and shipped.

The micropore open cell foam composites of the present invention contain phase change material in the amount of 80% volume or greater, thereby achieving a very high thermal energy storage capacity.

The % PCM by volume for a PCM/foam composite can be calculated in accordance with the following procedure:
(1) cut a foam block sample;
(2) measure the block and calculate the Block Volume;
(3) weigh the Foam Block before imbibing;
(4) measure or look up the PCM density;
(5) imbibe the PCM;
(6) weigh the imbibed Block
(7) calculate % PCM by volume according to the following equation:

$$\frac{\text{Imbibed Block Weight} - \text{Foam Block Weight}}{\text{Block Volume} \times \text{PCM density}} \times 100 = \% \text{ PCM by volume}$$

The micropore open cell foam composites of the present invention comprising PCM imbibed at 90% volume or greater were compared to PCM/silica gel compositions. When compared to the PCM/silica gel, the PCM/imbibed micropore open cell foam composites of the present invention contained 1.24 times as much PCM as the PCM/silica gel composition. Where space for the PCM is limited by the dimension of the shipping container, this greater amount of PCM provides a valuable increase in the time-at-temperature of the vaccine or other temperature sensitive payload in the shipping container.

While certain representative embodiments and details have been shown for purposes of illustrating the invention, it will be apparent to those skilled in the art that various changes in the methods and apparatus disclosed may be made without departing from the scope of the invention, which is defined in the appended claims:

What is claimed is:

1. A micropore open cell foam composite comprising an open cell foam having an open cell content of 80% or more and an average yore size of about 1 to 200 microns and a phase change material wherein the phase change material is present in the open cell foam in the amount of 80% volume or greater and the phase change material comprises an organic linear, crystalline alkyl hydrocarbon or mixture thereof having an average carbon chain length of at least 8 carbon atoms and a phase change temperature between −40° C. and 132° C.

2. The micropore open cell foam composite of claim 1 wherein the linear, crystalline alkyl hydrocarbon phase change material has an average carbon chain length of about 12 to 18 carbon atoms and a phase change temperature between 0° C. and 30° C.

3. The micropore open cell foam composite of claim 2 wherein said phase change material is a mixture comprising hexadecane, pentadecane, and tetradecane.

4. The micropore open cell foam composite of claim 3 wherein said phase change material comprises about 45 to 50 weight percent hexadecane, about 30 to 35 weight percent tetradecane, and about 15 to 25 weight percent of a mixture of N-paraffins having an average chain length of about 15 carbon atoms.

5. The micropore open cell foam composite of claim 4, wherein said phase change material comprises about 48 weight percent hexadecane, about 32 weight percent tetradecane, and about 20 weight percent of a mixture of n-paraffins having an average chain length of about 15 carbon atoms.

6. A micropore open cell foam composite comprising an open cell foam having an open cell content of 80% or more and an average yore size of about 1 to 200 microns and a phase change material wherein the phase change material is present in the open cell foam in the amount of 80% volume or greater and said phase change material further comprises an antioxidant in a concentration of about 0.1 to 1 weight percent.

7. A micropore open cell foam composite comprising an open cell foam having an open cell content of 80% or more and an average pore size of about 1 to 200 microns and a phase change material wherein the phase change material is present in the open cell foam in the amount of 80% volume or greater and the phase change material is selected from the group consisting of fatty acids, fatty acid esters, primary alcohols, ethylene glycol copolymers, polyethylene oxide and polyethylene.

8. A micropore open cell foam composite comprising an open cell foam having an open cell content of 80% or more and an average pore size of about 1 to 200 microns and a phase change material wherein the phase change material is present in the open cell foam in the amount of 80% volume or greater and the phase change material further comprises a soluble polymeric thickening agent wherein said thickening agent is present in an amount of about 0.1 to 10% based on the weight of the phase change material.

9. The micropore open cell foam composite of claim 8 wherein said phase change material is an organic phase change material and said polymeric thickening agent is selected from the group consisting of styrene/butadiene random and block copolymers, polybutadiene, polyisoprene, polyisobutylene polymers and copolymers, ethylene/propylene copolymers, polymethyl methacrylate polymers, and low and high density polyethylenes.

10. The micropore open cell foam composite of claim 8 wherein the phase change material is a polar water-based composition and the polymeric thickening agent is selected from the group consisting of polyvinyl alcohol, polyethylene glycol, polyethylene oxide, polyacrylic acid, polymethacrylate acid and vinyl acetate/maleic acid copolymers.

11. A micropore open cell foam composite comprising an open cell foam having an open cell content of 80% or more and an average pore size of about 1 to 200 microns and a phase change material wherein the phase change material is present in the open cell foam in the amount of 80% volume or greater and the phase change material comprises a liquefied gas.

12. The micropore open cell foam composite of claim 11 wherein said liquefied gas is selected from the group consisting of liquid nitrogen, helium, carbon dioxide, air and mixtures thereof.

13. A micropore open cell foam composite comprising an open cell foam having an open cell content of 80% or more and an average pore size of about 1 to 200 microns and a chase change material wherein the phase change material is present in the open cell foam in the amount of 80% volume or greater and the phase change material is solid carbon dioxide.

\* \* \* \* \*

UNITED STATES PATENT AND TRADEMARK OFFICE
CERTIFICATE OF CORRECTION

PATENT NO. : 6,765,031 B2
DATED : July 20, 2004
INVENTOR(S) : Ival O. Salyer et al.

It is certified that error appears in the above-identified patent and that said Letters Patent is hereby corrected as shown below:

Column 14,
Line 52, change the word "yore" to -- pore --.

Column 15,
Line 15, change the word "yore" to -- pore --.

Column 16,
Line 31, change the word "chase" to -- phase --.

Signed and Sealed this

Sixteenth Day of November, 2004

JON W. DUDAS
*Director of the United States Patent and Trademark Office*